United States Patent [19]
Ng et al.

[11] Patent Number: 5,699,287
[45] Date of Patent: Dec. 16, 1997

[54] METHOD AND DEVICE FOR ADDING AND SUBTRACTING THERMOMETER CODED DATA

[75] Inventors: Fuk Ho P. Ng, Dallas; Shivaling S. Mahant-Shetti, Richardson, both of Tex.

[73] Assignee: Texas Instruments Incorporated, Dallas, Tex.

[21] Appl. No.: 954,133

[22] Filed: Sep. 30, 1992

[51] Int. Cl.$^6$ .................................................. G06F 7/50
[52] U.S. Cl. ............................................................ 364/781
[58] Field of Search ....................................... 364/781, 782, 364/783, 768

[56] References Cited

U.S. PATENT DOCUMENTS

| | | | |
|---|---|---|---|
| 4,805,131 | 2/1989 | Adiletta et al. | 364/783 |
| 5,086,406 | 2/1992 | Okugawa et al. | 364/781 |

*Primary Examiner*—David H. Malzahn
*Attorney, Agent, or Firm*—Scott B. Stahl; W. James Brady, III; Richard L. Donaldson

[57] ABSTRACT

For subtracting two thermometer coded words each having a most significant byte (MSB) and a least significant byte (LSB), a check is made to see if a borrowing condition exists. A first borrowing condition exists if word B MSB is greater than word A MSB (12) and word A LSB is greater than word B LSB (14). In such a case a borrow (16) must take place on word B MSB. A second borrowing condition exists when word A MSB is greater than word B MSB (18) and word B LSB is greater than word A LSB (20). In this instance a borrow (22) must take place on word A MSB through a shift right function. After borrowing occurs, a subtraction process (24) takes place by exclusive-or'ing word A and B MSBs. The result is reconstructed (26) through a shift right process into proper thermometer code format. If a borrowing condition exists, an appropriate LSB is translated (28, 30) before an LSB subtraction process (32) takes the resulting word A and word B LSBs and exclusively-or's them together. The result is reconstructed (34) through a shift right rotate left process to place the LSB in proper thermometer code format. For addition, the first word is reversed (302) and added to the second word by an exclusive-or process. The result is inverted (306) and reconstructed (308) into proper thermometer code format. A carry (311) check is made and the reconstructed output is adjusted (310) whenever a carry condition exists. A further MSB adjustment (312) is made when the carry causes an overflow in the MSB result.

31 Claims, 6 Drawing Sheets

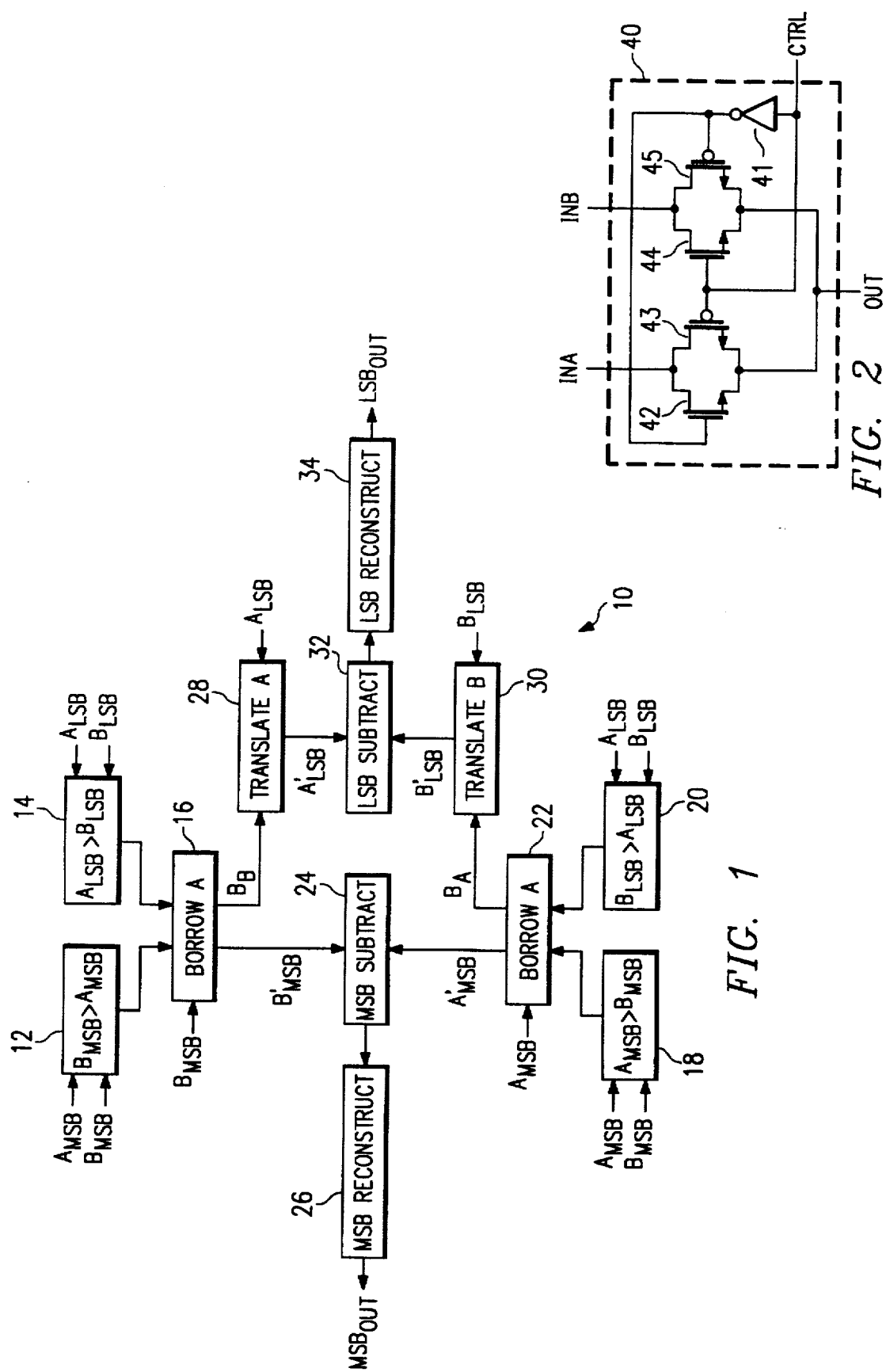

METHOD AND DEVICE FOR ADDING AND SUBTRACTING THERMOMETER CODED DATA

TECHNICAL FIELD OF THE INVENTION

This invention relates in general to signal processing technologies and more particularly to a method and device for adding and subtracting thermometer coded data.

BACKGROUND OF THE INVENTION

In certain applications, computation of maxima and minima is extensive. For such applications, it is desirable to represent a number in thermometer code since calculation of maxima or minima becomes a straightforward process. Thermometer coded data is used to indicate a specific value represented by the data. For example, the value of 5 in thermometer code is represented in binary form as 00011111 for an 8 bit data format. The more logic "1s" in the data in right justified order, the higher the value, and vice versa.

One disadvantage of a straight thermometer code is the number of bits required to represent a number e.g. 64 bits to represent a value of 63. One solution around this problem is to represent each digit of a multidigit number in thermometer code. To represent a value of 63, a two digit octal number can be used, one for each digit of the value. If each octal number has 8 bits, then 16 bits of data rather than 64 bits will be needed to represent the value.

Some computations will require arithmetic operations besides maxima and minima processing. Conventional signal processing technology cannot simply and accurately perform arithmetic operations on thermometer coded words. Further, conventional technology cannot perform arithmetic operation or multi digit representations of thermometer coded data. It is thus desirable to have a circuit which can perform addition and subtraction of thermometer coded words to enhance signal processing of data represented in thermometer code.

From the foregoing, it may be appreciated that a need has arisen for a method and device for processing thermometer coded data. A need has also arisen for a method and device which can perform arithmetic functions on thermometer coded data. A need has also arisen to perform arithmetic operations on multi digit representations of thermometer coded data. Further, a need has arisen for a method and device which can add and subtract two thermometer coded words.

SUMMARY OF THE INVENTION

In accordance with the present invention, a method and device for adding and subtracting thermometer coded data are provided which substantially eliminate or reduce disadvantages and problems associated with prior signal processing of thermometer coded data.

The present invention includes circuitry for determining whether a borrowing condition exists for a least significant byte of a thermometer coded word during an absolute value subtraction process. A borrowing condition exists if the most significant byte of word one is greater than the most significant byte of word two and the least significant byte of word two is greater than the least significant byte of word one, or vice versa. If no borrowing condition exists, the most significant bytes of the two words are subtracted from each other by an exclusive-or process and the result is reconstructed by shifting to the right the bit positions until the result is in proper thermometer code format. Similarly, the least significant bytes of the two words are subtracted from each other by an exclusive-or process to produce a result which is also shifted into proper thermometer code format. If a borrowing condition exists, the most significant byte of word one is shifted to the right once and the least significant byte of word two is translated in response to the borrowing condition before least significant byte subtraction occurs. The result of the subtraction is processed through a shift right, rotate left circuit to place the result, which becomes the resulting least significant byte of the absolute value subtraction function, into proper thermometer code format.

For an addition process, the first thermometer coded word is reversed and then subtracted by an exclusive-or process from the second thermometer coded word. The result of the addition is inverted and reconstructed into proper thermometer code format. If a carry condition exists on the least significant byte, as determined by a carry circuit, the most significant byte of the resulting word is adjusted by the carry to produce the final most significant byte. If a carry condition exists on the most significant byte, a carry flag is set indicating that the most significant byte includes a carry condition.

The present invention provides various technical advantages over thermometer code processing systems within the prior art. One technical advantage is in the ability to perform arithmetic functions on thermometer coded data. Another technical advantage is in providing addition and absolute value subtraction on thermometer coded data. Still another technical advantage is in the ability to perform separate arithmetic functions on the most significant bytes and the least significant bytes of desired thermometer coded words. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 1 illustrates a block diagram of an absolute value subtraction circuit of the preferred embodiment;

FIG. 2 illustrates a simplified schematic diagram of a multiplexer implemented within the preferred absolute value subtraction circuit;

DETAILED DESCRIPTION OF THE INVENTION

Figure 3:
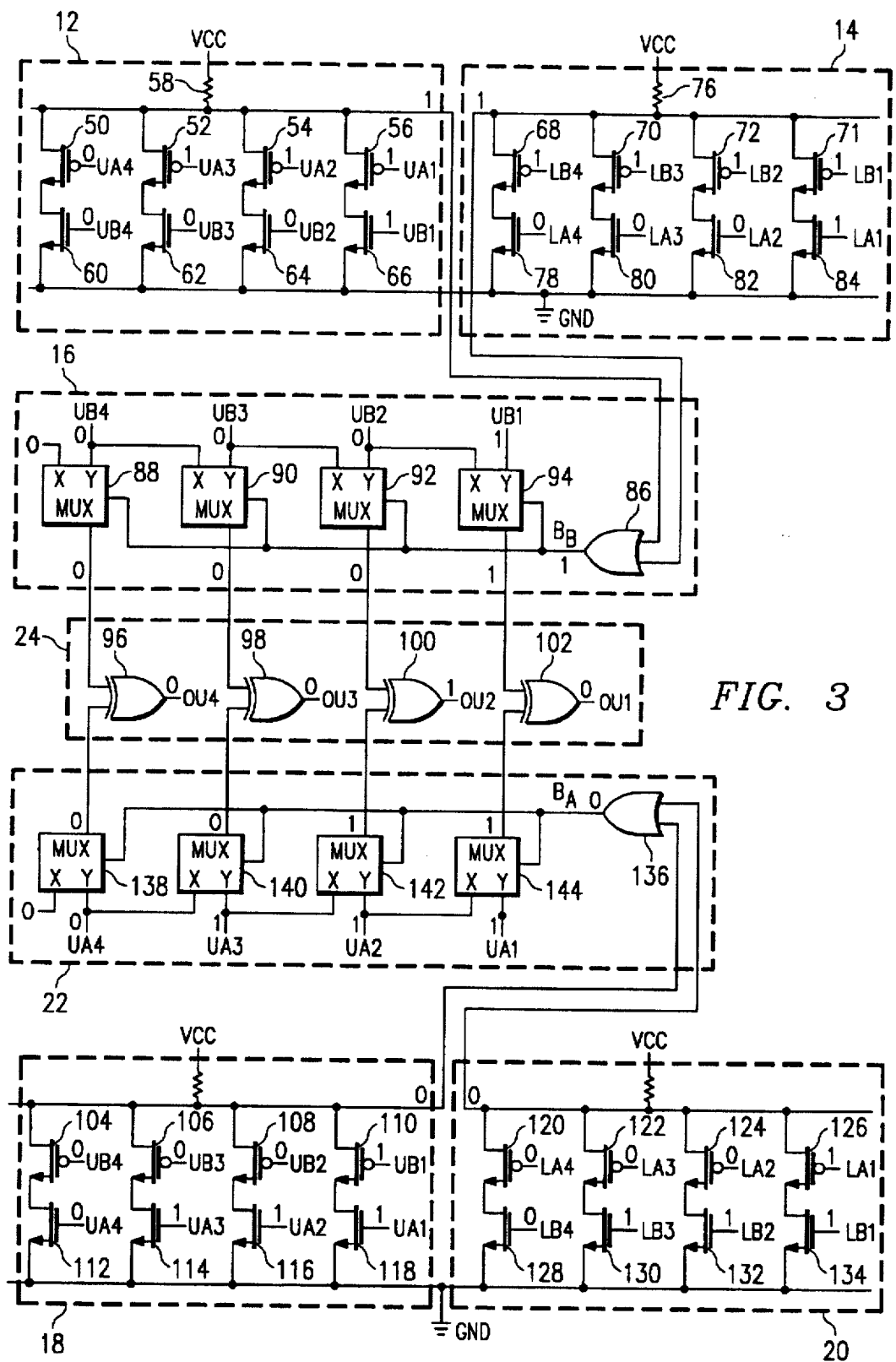
FIG. 3 illustrates a simplified schematic diagram of a most significant byte portion of the preferred absolute value subtraction circuit.

FIG. 1 is a block diagram of an absolute value subtraction circuit 10 of the present invention. Absolute value subtraction circuit 10 includes a most significant byte (MSB) check block 12 and a least significant byte (LSB) check block 14 connecting to a word B borrow block 16. Absolute value subtraction circuit 10 also includes an MSB check block 18 and an LSB check block 20 connecting to a word A borrow block 22. A subtract block 24 connects to word B borrow block 16 and word A borrow block 22 and provides an output to an MSB reconstruct block 26 for generation of a resulting MSB at $MSB_{out}$. Word B borrow block 16 provides a borrow signal $B_b$ to an LSB A translate block 28 and word A borrow block 22 provides a borrow signal $B_a$ to an LSB B translate block 30. An LSB subtract block 32 receives translated LSBs from LSB A translate block 28 and LSB B translate block 30, providing an output to an LSB reconstruct block 34 for generation of a resulting LSB at $LSB_{out}$.

In operation, check blocks 12 and 14 determine whether a first borrowing condition exists and check blocks 18 and 20 determine whether a second borrowing condition exists. For the first borrowing condition to exist, the MSB of word B must be greater than the MSB of word A and the LSB of word A must be greater than the LSB of word B. The second borrowing condition exists when the MSB of word A is greater than the MSB of word B and the LSB of word B is greater than the LSB of word A. If the first borrowing condition exists, word B borrow block 16 shifts each bit position of the MSB of word B once to the right, reducing the thermometer code value of the MSB of word B by 1. Word B borrow block 16 provides subtract block 24 with the new MSB of word B and indicates the occurrence of a borrow on signal $B_b$. If the first borrowing condition does not exist, the MSB of word B passes through word B borrow block 16 to subtract block 24 without being shifted and borrow signal $B_b$ indicates that borrowing did not occur.

Similarly, if the second borrowing condition exists, word A borrow block 22 shifts each bit position of the MSB of word A once to the right and provides the new MSB of word A to subtract circuit 24. Signal $B_a$ indicates the presence of the second borrowing condition. If the second borrowing condition does not exist, the MSB of word A passes through word A borrow block 22 to subtract block 24 without being shifted and signal $B_a$ indicates that the second borrowing condition does not occur. MSB subtract circuit 24 takes the modified or unmodified MSB for words A and B, depending on whether either borrowing condition occurs, and performs an exclusive-or function at each bit position of the two words. MSB reconstruct block 26 takes the result and performs a right shift of the bit positions in the result until the result is placed into proper thermometer code format. The output from MSB reconstruct block 26 is the most significant byte portion of the resulting word from the absolute value subtraction function.

For the least significant byte, if borrow signal $B_b$ indicates that the first borrowing condition exists, LSB A translate block 28 takes the LSB of word A and subtracts the LSB of word A from the thermometer code base of the least significant byte to place the LSB of word A into proper form for LSB subtract block 32. If the first borrowing condition does not exist, the LSB of word A passes through LSB A translate block 28 to LSB subtract block 32 without any alteration. Similarly, if signal $B_a$ indicates the existence of the second borrowing condition, LSB B translate block 30 takes the LSB of word B and places the LSB of word B in proper form for LSB subtract block 32. If the second borrowing condition does not exist, the LSB of word B passes through LSB B translate block 30 to LSB subtract block 32 without alteration.

In principle, the word with the larger LSB is subtracted from the base for the least significant byte and added to the LSB of the other word to produce the resulting thermometer code LSB result as represented by the expression Base– $B_{LSB} + A_{LSB} = Out_{LSB}$. In practice, LSB A translate block 28 and LSB translate block 30 perform this function by inverting their corresponding LSBs, shifting the inverted LSB once to the right, and providing the altered LSB to LSB subtract block 32 where it is exclusive-or'ed to the other LSB. LSB reconstruct block 32 takes the result of the exclusive-or function and performs a shift right rotate left process to produce the thermometer code LSB result.

FIG. 2 is a simplified schematic diagram of a multiplexer 40 used in absolute value subtraction circuit 10. Multiplexer 40 comprises an inverter 41 and n-channel transistors 42, 43, 44, and 45. Transistors 43 and 45 have inverting inputs. Transistors 43 and 44 have gates connected to a signal CTRL and transistors 42 and 45 have gates connected to inverter 41 to receive inverted signal CTRL. Transistors 42 and 43 have drains connected to an input signal INA at line X. Transistors 44 and 45 have drains connected to an input signal INB at line Y. The sources of each transistor connect to an output signal OUT.

In operation, a logic zero level on signal CTRL turns off transistors 44 and 45 and turns on transistors 42 and 43, allowing input signal INA on line X to appear on output signal OUT. Conversely, a logic one level on signal CTRL turns on transistors 44 and 45 and turns off transistors 42 and 43, allowing input signal INB or line Y to appear on output signal OUT. In this manner, multiplexer 40 selects which one of two input signals is to be transmitted on the multiplexer output signal.

FIG. 3 is a simplified schematic diagram of a portion of absolute value subtraction circuit 10. For purposes of illustration and discussion, each thermometer coded word comprises two 4 bit bytes, representing the most significant byte and least significant byte for each word. Each byte may consist of a greater or fewer number of bits as required for the desired application and each thermometer coded word may consist of a greater or fewer number of bytes. Check block 12 comprises n-channel transistors 50, 52, 54, and 56 with inverting inputs and having drains tied to supply voltage VCC through resistor 58 and gates tied to a separate bit position of the MSB of word A represented by signals UA4, UA3, UA2, and UA1, respectively. Check block 12 further comprises n-channel transistors 60, 62, 64, and 66 having sources tied to signal GND and gates tied to a separate bit position of the MSB of word B represented by signals UB4, UB3, UB2, and UB1, respectively. The sources of each p-channel transistor connect to the drains of each n-channel transistor to form a transistor pair for each corresponding bit position of the MSBs of words A and B.

Similarly, check block 14 comprises n-channel transistors 68, 70, 72, and 74 with inverting inputs and having drains connected to supply voltage VCC through resistor 76 and gates connected to a separate bit position of the MSB of word B represented by signals LB4, LB3, LB2, and LB1, respectively. Check block 14 also comprises n-channel transistors 78, 80, 82, and 84 having sources connected to signal GND and gates connected to a separate bit position of the LSB of word A represented by signals LA4, LA3, LA2, and LA1, respectively.

Check blocks 12 and 14 provide output signals to word B borrow block 16 at OR gate 86 that feeds the control lines of multiplexers 88, 90, 92, and 94. Multiplexers 88, 90, 92, and 94 receive a separate bit position of the MSB of word B represented by UB4, UB3, UB2, and UB1, respectively, and provide outputs to MSB subtract block 24 at exclusive-or gates 96, 98, 100, and 102, respectively. MSB subtract block 24 provides outputs OU4, OU3, OU2, and OU1 from exclusive-or gates 96, 98, 100, and 102, respectively.

Check block 18 is similarly constructed to check block 12 except that each bit position of the MSB of word B is tied to a gate of n-channel transistors 104, 106, 108, and 110 with inverting inputs, respectively, and each bit position of the MSB of word A is tied to a gate of n-channel transistors 112, 114, 116, and 118, respectively. Check block 20 is constructed similarly to check block 14 except that each bit position of the LSB of word A is tied to a gate of n-channel transistors 120, 122, 124, and 126 with inverting inputs, respectively, and each bit position of the MSB of word B is tied to a gate of n-channel transistors 128, 130, 132, and 134, respectively.

The outputs of check blocks 18 and 20 connect to word A borrow block 22 at OR gate 136 that feeds multiplexers 138, 140, 142, and 144. Multiplexers 138, 140, 142, and 144 receive a separate bit position of the MSB of word A represented by signals UA4, UA3, UA2, and UA1, respectively and generate output signals for MSB subtract block 24 at exclusive-or gates 96, 98, 100, and 102, respectively.

In operation, check blocks 12 and 14 determine whether the first borrowing condition exists. For purposes of illustration, word A is 0111 0001 and word B is 0001 1111, to be placed in the absolute value expression of |A−B|. For the first borrowing condition to exist, the outputs of both check blocks 12 and 14 that feed OR gate 86 of word B borrow block 16 must be at a logic zero level. To obtain a logic zero level, an n-channel transistor pair must both be turned on in producing a logic zero level at the output. For the example words given, no transistor pair within check block 12 conducts to generate a logic zero level and thus the output remains at the logic one level state. N-channel transistors 60, 62, and 64 remain off, since corresponding bit positions UB4, UB3, and UB2 of word B are at a logic zero level state. Though transistor 66 does turn on due to the high state of signal UB1, the high state at signal UA1 turns transistor 56 off to keep the transistor pair from conducting.

Similarly, check block 14 generates a logic one level output because transistors 78, 80, and 82 remain off according to the bit positions of the least significant byte of word A represented by signals LA4, LA3, and LA2, respectively. Though transistor 84 turns on due to the high level state of signal LA1, transistor 74 remains off due to the high level state of LB1 of word B and thus no transistor pair is conducting and the output of check block 14 is at a logic one level state.

With the outputs from check blocks 12 and 14 at the high level state, word B borrow block 16 passes the MSB of word B represented by signals UB4, UB3, UB2, and UB1 to MSB subtract block 24 without shifting the MSB of word B to the right. This is accomplished by signal $B_b$ from OR gate 86 being at the logic one level state and acting as the control line for multiplexers 88, 90, 92, and 94 to pass the MSB of word B over line Y of each multiplexer to MSB subtract block 24.

Check blocks 18 and 22 determine whether the second borrowing condition exists. Check blocks 18 and 20 are pull down circuits similar to check blocks 12 and 14 except that the MSB of word B is tied to the n-channel transistors with inverting inputs of check block 18 and the LSB of word B is tied to the n-channel transistors of block 20, a situation reversed for check blocks 12 and 14. Check blocks 18 and 20 check to see if the MSB of word A is greater than the MSB of word B and the LSB of word B is greater than the LSB of word A, respectively. For the example words given, transistor pairs 110 and 118 are off due to the logic one level input from signal UB1. Transistor pair 108 and 116 are on, since signal UB2 is at a logic zero level and signal UA2 is at a logic one level. With transistor pair 108 and 116 conducting, the output signal is pulled down to ground, generating a logic zero level state on the output of check block 18. Similarly, check block 20 also generates a logic zero level state on its output through the conducting of transistor pair 124 and 132. A logic zero level on signal LA2 and a logic one level on signal LB2 cause transistors 124 and 132 to turn on, respectively, forcing output voltage from VCC to pull down to ground.

The logic zero level outputs of check blocks 18 and 20 cause OR gate 136 of word A borrow block 22 to generate a logic zero level signal $B_a$ connected to the control lines of multiplexers 138, 140, 142, and 144. A logic zero level on signal $B_a$ forces multiplexers 138, 140, 142, and 144 to transfer inputs on their respective X lines to MSB subtract block 24. The MSB of word A represented by signals UA4, UA3, UA2, and UA1 are reduced by a value of one through a right shift by multiplexers 138, 140, 142, and 144. As will be subsequently shown, signal $B_a$ will be used to place the borrowed element within the least significant byte process circuitry.

The MSB subtract function is performed in exclusive-or gates 96, 98, 100, and 102 within MSB subtract block 24. Each bit position of the MSB of word B from word B borrow block 16 is exclusively-or'ed with each corresponding bit position of the MSB of word A from word A borrow block 22 through OR gates 96, 98, 100, and 102 and the results are generated on output signals OU4, OU3, OU2, and OU1, respectively. These output signals are then sent to MSB reconstruct block 26.

Figure 4:
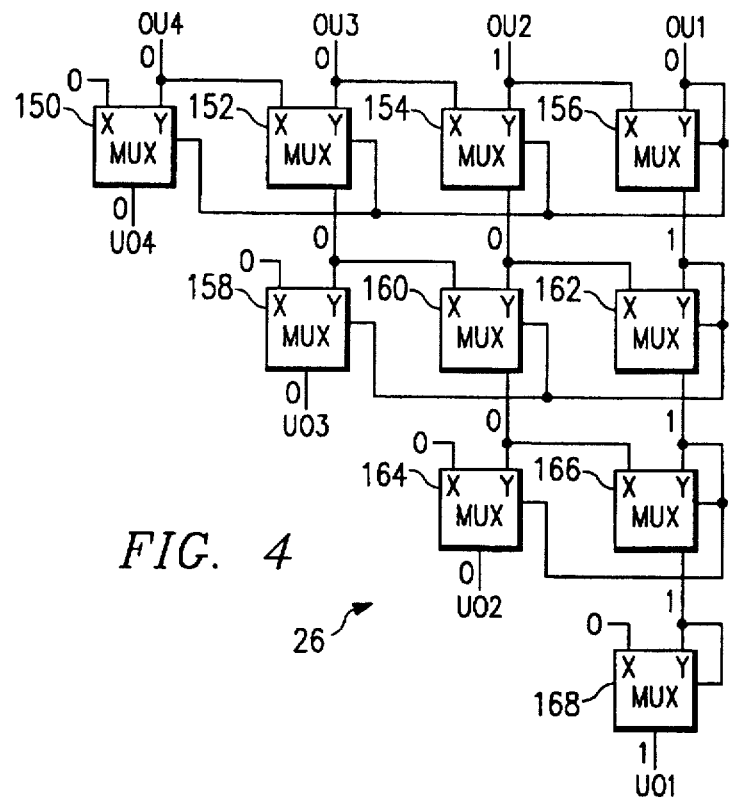
FIG. 4 illustrates a simplified schematic diagram of a reconstruction circuit for the most significant byte portion of the preferred absolute value subtraction circuit.

FIG. 4 is a simplified schematic diagram of MSB reconstruct block 26. MSB reconstruct block 26 comprises multiplexers 150, 152, 154, and 156 that receive output signals from MSB subtract block 24 on signals OU4, OU3, OU2, and OU1, respectively. MSB reconstruct block 26 further comprises multiplexers 158, 160, 162, 164, 166, and 168 connected together as shown.

In operation, MSB reconstruct block 26 performs a shift right function on output results OU4, OU3, OU2, and OU1 from exclusive-or gates 96, 98, 100, and 102 until a logic one level appears on the lower level bit position, indicating that the resulting MSB is in proper thermometer code format. Since proper thermometer code format occurs when the low order bit position is at a logic one level, successive values of signal OU1 connect to the control lines of each multiplexer for each shifting stage. Shifting occurs when signal OU1 and its successive values are at a logic zero level state and shifting ceases once a successive OU1 value reaches a logic one level. Though only one shifting stage is required for the example given, the remaining multiplexers insure that a proper thermometer code output on signals U04, U03, U02, and U01 occurs for each possible value of signals OU4, OU3, OU2, and OU1. MSB reconstruct block 26 generates the final $MSB_{out}$ signal over lines U04, U03, U02, and U01. For least significant bit processing, the borrow signals $B_b$ and $B_a$ are used to transform the LSB of words A and B into proper processing format.

Figure 5:
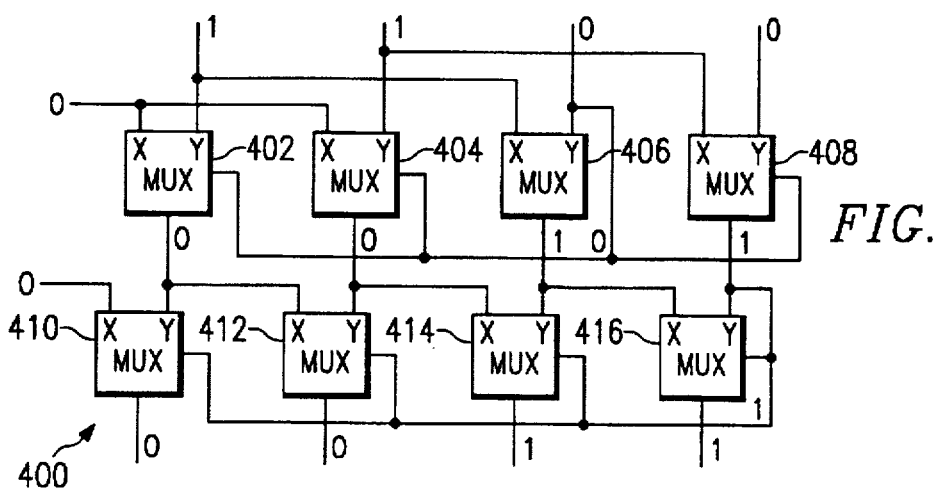
FIG. 5 illustrates a simplified schematic diagram of a binary parallel shifter for a reconstruction circuit of the preferred embodiment.

FIG. 5 is a simplified schematic diagram of a binary parallel shifter 400 which may be used in place of the reconstruction circuit of FIG. 4. Binary parallel shifter 400 comprises a first stage of multiplexers 402, 404, 406, and 408 connected to a second stage of multiplexers 410, 412, 414, and 416. Binary parallel shifter 400 places an input into proper thermometer code format by performing factor of 2 right shifting in response to logic levels on the factor of 2 bit positions of the input. The number of multiplexer stages is logarithmically proportional to the number of bit positions in the input. Thus, for the four bit input shown, 2 stages are required for complete shifting. For an 8 bit input, 3 stages of multiplexers are needed to shift the input into proper thermometer code format.

The control lines for each multiplexer connect to factor of 2 bit positions of the input. In the first stage, the second bit position controls shifting of the input at multiplexers 402, 404, 406, and 408. If the second bit position is at a logic zero level, the first stage shifts the input two places to the right by introducing logic zeros into the high order bit positions, indicating that thermometer code values are in the high order bit positions of the input. In the second stage, the first bit position connects to the control lines of multiplexers 410, 412, 414, and 416. If the first bit position is at a logic zero level, the second stage shifts the first stage result one place to the right and generates an output in proper thermometer code format. For an 8 bit input, the fourth bit position controls the first stage, the second bit position controls the second stage, and the first bit position controls the third stage.

Figure 6:
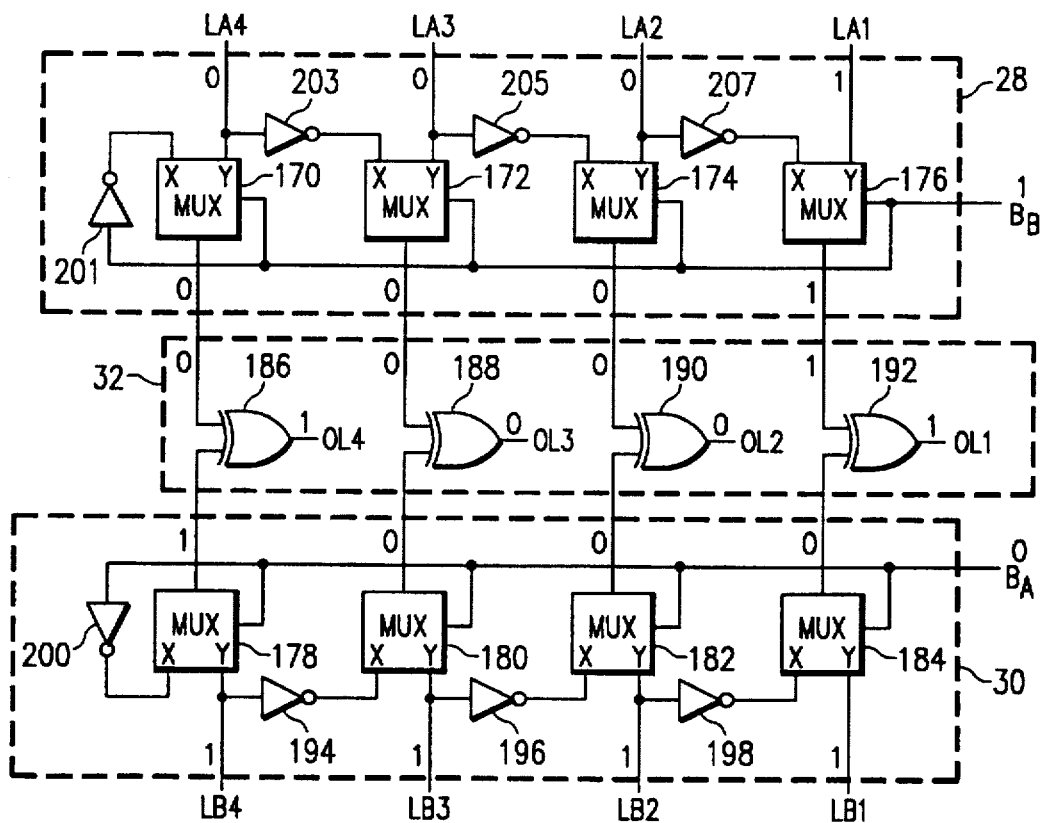
FIG. 6 illustrates a simplified schematic diagram of a least significant byte portion of the preferred absolute value subtraction circuit.

FIG. 6 is a simplified schematic diagram of the translation and subtraction functions performed on the LSBs of words A and B. LSB A translate block 28 comprises multiplexers 170, 172, 174, and 176 connected to LSB word A signals LA4, LA3, LA2, and LA1, respectively. Multiplexers 170, 172, 174, and 176 have control lines tied to signal $B_b$ and provide outputs to LSB subtract block 32. LSB B translate block 30 comprises multiplexers 178, 180, 182, and 184, receiving LSB word B signals LB4, LB3, LB2, and LB1, respectively. Multiplexers 178, 180, 182, and 184 have control lines tied to signal $B_a$ and provide outputs through LSB subtract block 32. LSB subtract block 32 comprises exclusive-or gates 186, 188, 190, and 192, generating output signals OL4, OL3, OL2, and OL1 for LSB reconstruct block 34.

To subtract a larger LSB from a smaller LSB, the larger LSB is subtracted from the base of the LSB and then added to the smaller LSB to produce the resulting LSB output. To subtract the larger LSB from the base of the LSB and then add it to the smaller LSB in thermometer code, the larger LSB is inverted, shifted to the right once by introducing a one in the high order bit position, exclusive-or'ed with the smaller LSB, and the result reconstructed into proper thermometer code format. LSB A translate block 28 performs this function whenever the first borrowing condition exists as indicated by signal $B_b$ and LSB B translate block 30 performs this function whenever the second borrowing condition exists as indicated by signal $B_a$.

For the example given, a logic one level on signal $B_b$ indicates that the first borrowing condition does not exist and thus no translation is required on the LSB of word A. Multiplexers 170, 172, 174, and 176 pass the LSB word A signals LA4, LA3, LA2, and LA1 on respective Y lines to LSB subtract block 32 without any translation. A logic zero level on signal $B_a$ indicates that the second borrowing condition exists, causing the LSB of word B to be translated within LSB B translate block 30 according to the process described above. A logic zero level on signal $B_a$ places the signals on the X lines of multiplexers 178, 180, 182, and 184 onto respective output lines. The LSB of word B is inverted through NOT gates 194, 196, and 198 and shifted to the right once by introducing a one from NOT gate 200. LSB A translate block 28 has similar NOT gates 201, 203, 205, and 207 for shifting and inverting when the first borrowing condition exists.

LSB subtract block 32 receives the translated LSB of word B and the LSB of word A at exclusive-or gates 186, 188, 190, and 192 and generates output signals OL4, OL3, OL2, and OL1. Output signals OL4, OL3, OL2, and OL1 are sent to LSB reconstruct block 34 to be placed in proper thermometer code format.

Figure 7:
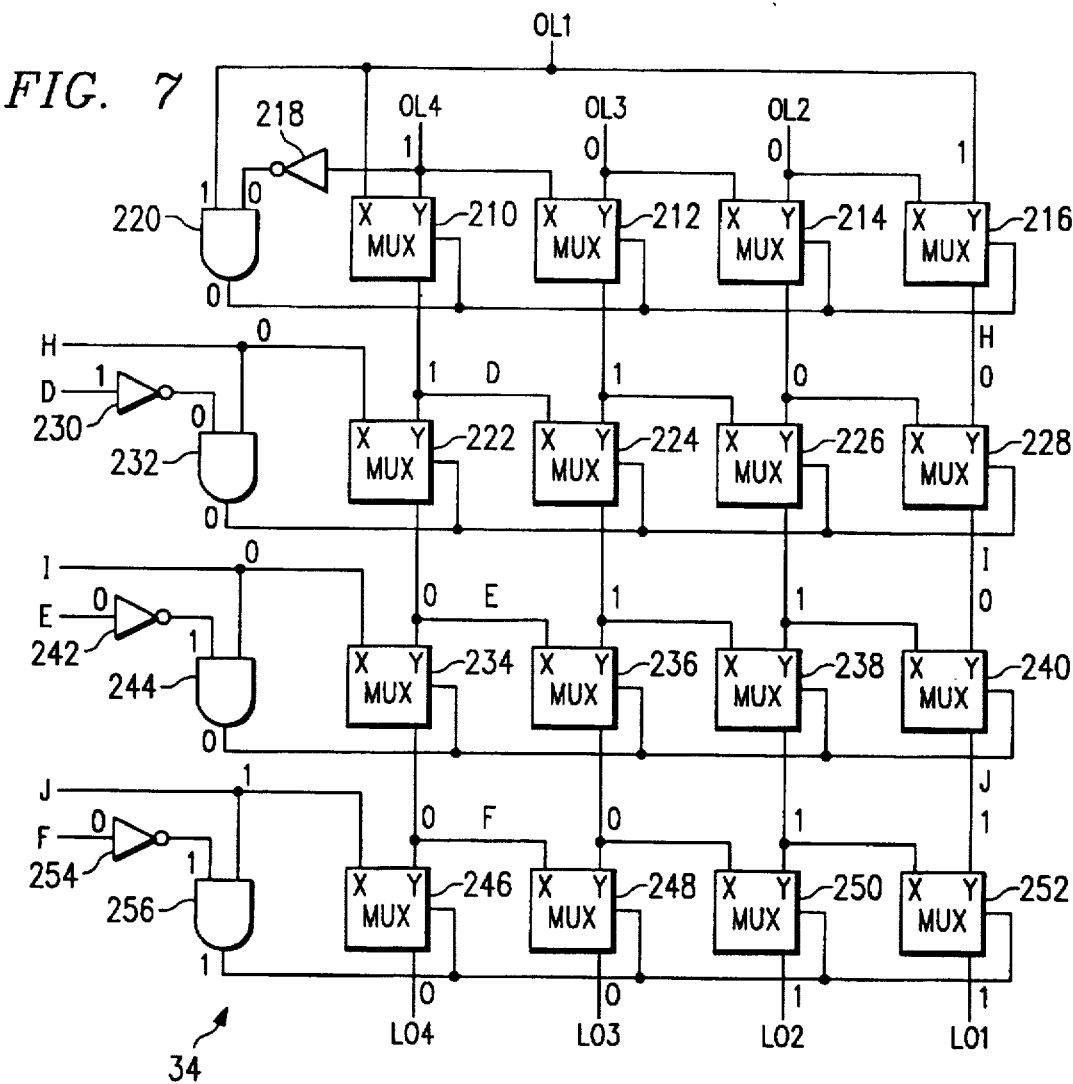
FIG. 7 illustrates a simplified schematic diagram of the least significant byte reconstruction circuit for the preferred absolute value subtraction circuit.

FIG. 7 is a simplified schematic diagram of LSB reconstruct block 34. LSB reconstruct block 34 receives output signals OL4, OL3, OL2, and OL1 from LSB subtract block 32 at a first multiplexer stage comprising multiplexers 210, 212, 214, and 216 and NOT gate 218 and NAND gate 220. First multiplexer stage connects to a second multiplexer stage comprising multiplexers 222, 224, 226, and 228 and NOT gate 230 and NAND gate 232. The second multiplexer stage connects to a third multiplexer stage comprising multiplexers 234, 236, 238, and 240 and NOT gate 242 and NAND gate 244. The third multiplexer stage connects to a fourth multiplexer stage comprising multiplexers 246, 248, 250, and 252 and NOT gate 254 and NAND gate 256. The fourth multiplexer stage generates the LSB out signals L04, L03, L02, and L01.

In operation, LSB reconstruct block 34 performs a shift right rotate left function until the LSB is placed in proper thermometer code format. Each multiplexer stage performs a shift right rotate left function until proper thermometer code format is achieved as indicated by a logic one level on the low order bit and a logic zero level on the high order bit of the LSB.

In the first multiplexer stage, NOT gate 218 and NAND gate 220 determine if the proper thermometer code condition exists. Since it does not for the illustrated example, the LSB is shifted to the right and a low order bit is rotated around to the high order bit position. The input of line X for each of multiplexers 210, 212, 214, and 216 passes to the second multiplexer stage due to the logic zero level from NAND gate 220. At the second multiplexer stage, NOT gate 230 and NAND gate 232 determine if the proper thermometer code condition exists. Since it does not for the illustrated example, the second multiplexer stage performs the shift right rotate left function by passing the input on line X for each of multiplexers 222, 224, 226, and 228 to the third stage due to the logic zero level from NAND gate 232.

At the third stage, NOT gate 242 and NAND gate 244 determine if the thermometer code condition exists. Since it still does not exist, the shift right rotate left function is performed by passing the input of line X for each of multiplexers 234, 236, 238, and 240 to the fourth multiplexer stage due to the logic zero level from NAND gate 244. At the fourth logic stage, NOT gate 254 and NAND gate 256 determine if the thermometer code condition exists. Since the thermometer code condition does now exist, a logic one level from NAND gate 256 causes the input of line Y for each of multiplexers 246, 248, 250, and 252 to pass onto output signals L04, L03, L02, and L01 without further shifting or rotating. Signals L04, L03, L02, and L01 thus become the resulting LSB output.

The four multiplexer stages insure that all possible configurations of signals OL4, OL3, OL2, and OL1 are placed in a proper thermometer code format. Even a configuration of 0000 (or 1111) on LSB subtract block 32 output lines OL4, OL3, OL2, and OL1, though never indicating a proper thermometer code condition in each multiplexer stage, will have an LSB output of 0000 (or 1111) at LSB output signals L04, L03, L02, and L01.

Figure 8:
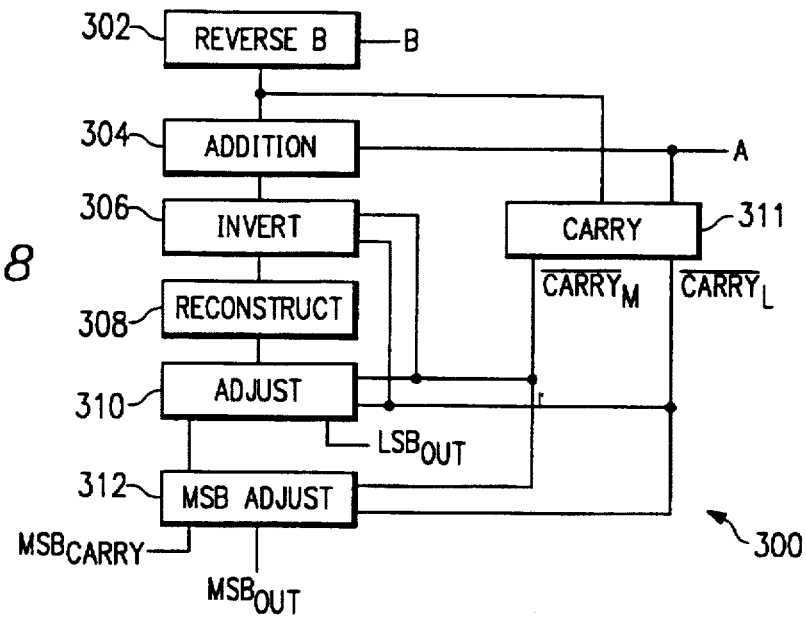
FIG. 8 illustrates a block diagram of an addition circuit of the preferred embodiment.

FIG. 8 is a block diagram of an addition circuit 300 for adding two thermometer coded words A and B together. Addition circuit 300 includes word B reverse block 302 connected to an addition block 304, each receiving word B and word A, respectively. Addition block 304 connects to an invert block 306 that provides signals to a reconstruct block 308. Reconstruct block 308 connects to an adjust block 310 that generates the resulting LSB at $LSB_{out}$. A carry block 311 receives word A and reverse word B and generates carry signals $\overline{carry_M}$ and $\overline{carry_L}$ for adjust block 310 and invert block 306. An MSB adjust block 312 connects to adjust block 310 to place the MSB output from adjust block 310 into proper thermometer code format in response to signal $\overline{carry_L}$ from carry block 311.

To add two thermometer code words together, the bit positions of the second word are reversed and then exclusive-or'ed with the first word. The reversed second word is compared to the first word to determine whether a carry condition occurs by monitoring for dual logic one levels at corresponding bit positions for each word and providing a carry signal in response to this match. The bit positions of the result are then inversed if a carry occurs and the result is reconstructed into proper thermometer code format. The reconstructed output is adjusted to compensate for the existence of a carry condition. The LSB output of adjust block 310 is the final LSB result of the addition process. The MSB result produced from adjust block 310 is increased by one through a shift left function within MSB adjust block 312 in response to a carry condition on the LSB to obtain the final MSB result of the addition process. MSB adjust block 312 also generates an $MSB_{carry}$ signal to flag a carry condition occurring in the MSB of the resulting thermometer coded word.

Figure 9:
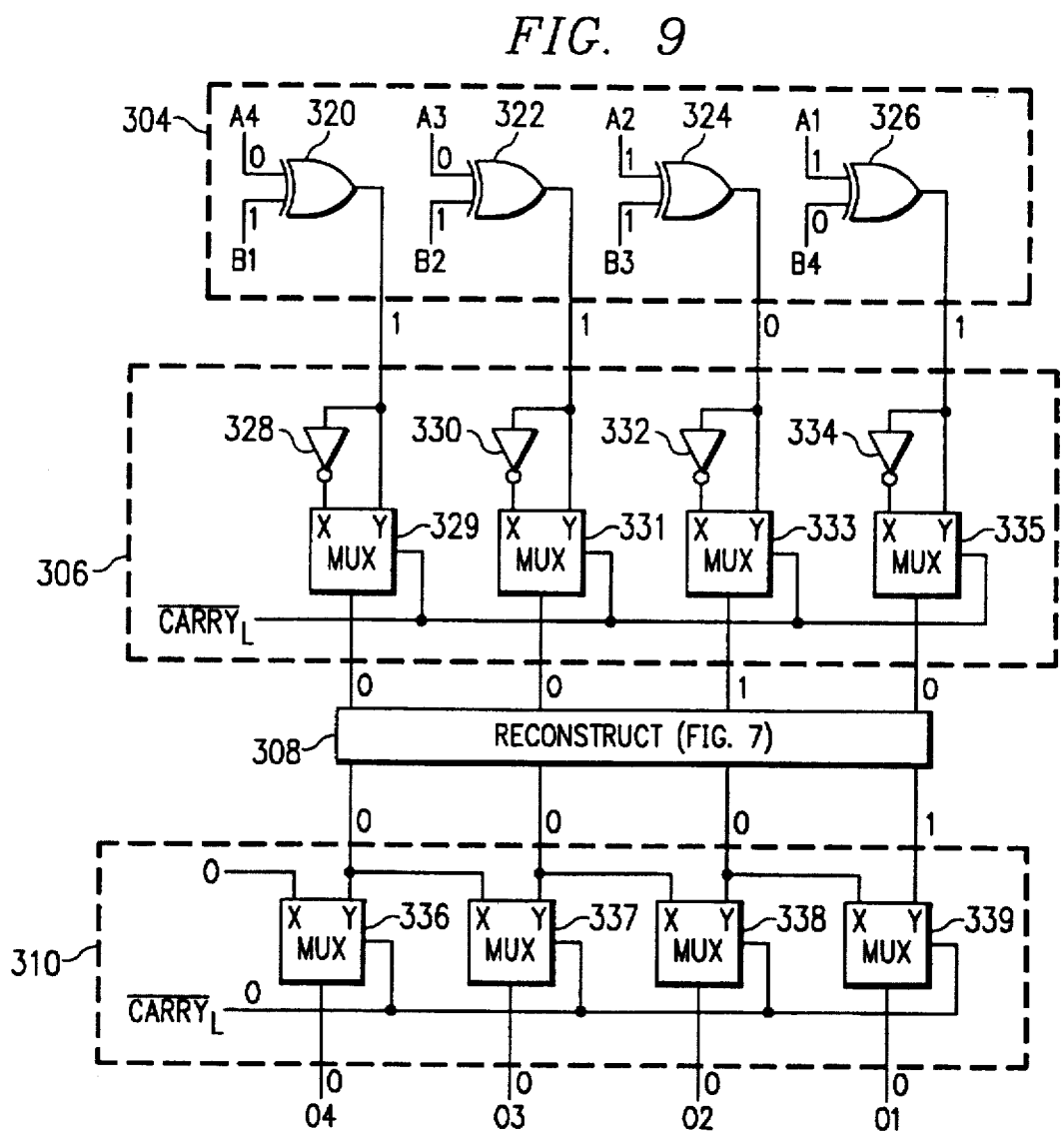
FIG. 9 illustrates a simplified schematic diagram of a portion of the preferred addition circuit.

FIG. 9 is a simplified schematic diagram of the LSB portion of addition circuit 300. Addition block 304 comprises exclusive-or gates 320, 322, 324, and 326 having outputs tied to NOT gates 328, 330, 332, and 334, and multiplexers 329, 331, 333, and 335, respectively. The outputs of multiplexers 329, 331, 333, and 335 enter reconstruct block 308 which may be identical to the reconstruct block circuit found in FIG. 7. Reconstruct block 308 provides outputs to adjust block 310 comprising multiplexers 336, 337, 338, and 339.

For addition block 304, bit positions for word B are reversed such that signal B1 is exclusive-or'ed to signal A4, signal B2 is exclusive-or'ed to signal A3, signal B3 is exclusive-or'ed to signal A2, and signal B4 is exclusive-or'ed to signal A1. The result of the exclusive-or function is inverted if a carry exists or passes through to reconstruct block 308 from multiplexers 329, 331, 333, and 335 without an inversion if there is no carry. The final thermometer code least significant byte of the addition process is output by adjust block 310 over output lines $0_4$, $0_3$, $0_2$, and $0_1$. Though not shown, the MSB portion of addition circuit 300 generates output signals $0_8$, $0_7$, $0_6$, and $0_5$ through signal $\overline{carry_M}$ in the same manner as illustrated with the LSBs of words A and B.

Figure 10:
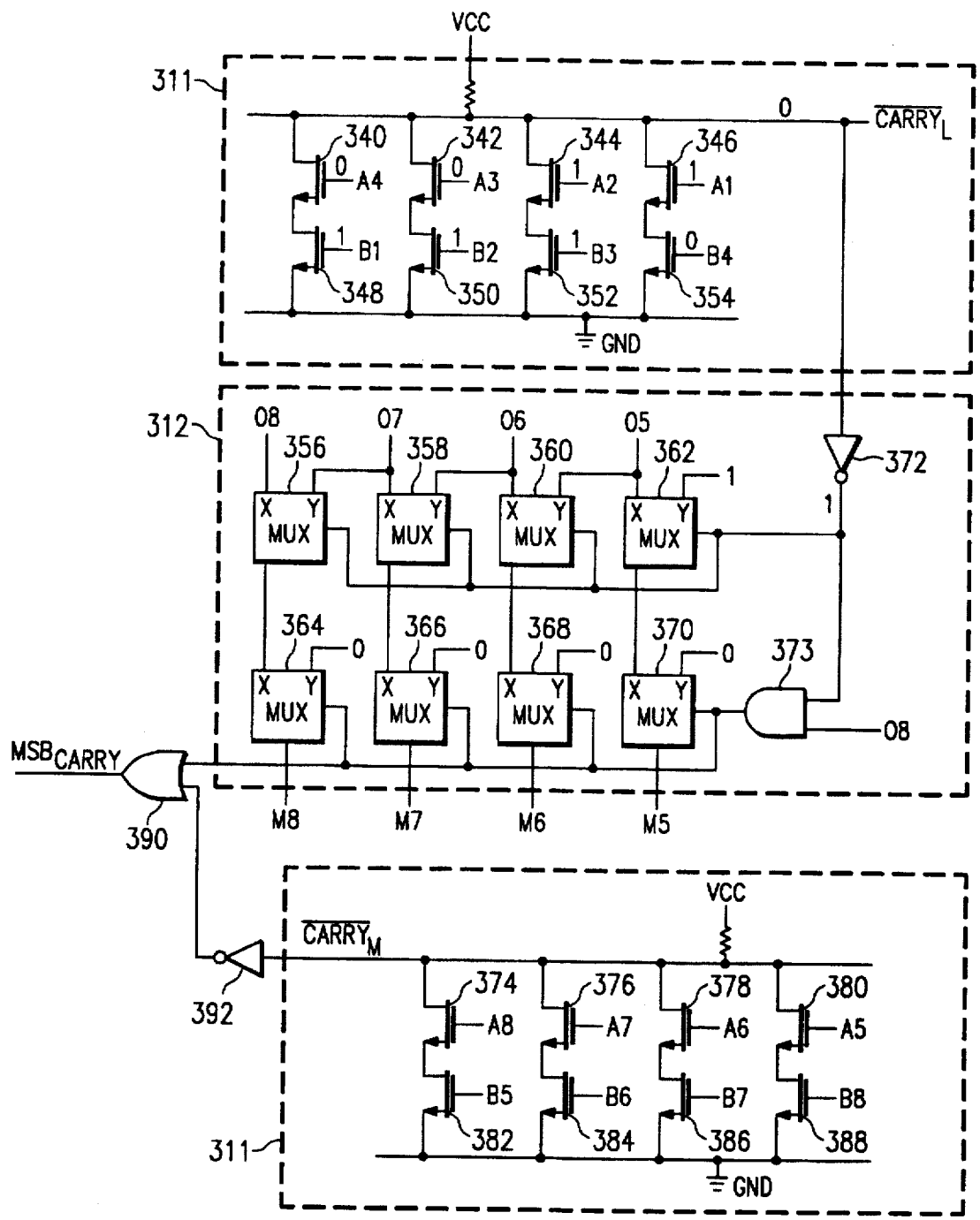
FIG. 10 illustrates a simplified schematic diagram of a carry circuit and a MSB adjust circuit for the preferred addition circuit.

FIG. 10 shows the remaining portion of addition circuit 300 comprising carry block 311 and MSB adjust block 312. Carry block 311 includes a pull down transistor circuit comprising n-channel transistors 340, 342, 344, and 346 coupled to LSB word A signals A4, A3, A2, and A1, respectively, and n-channel transistors 348, 350, 352, and 354 coupled to LSB word B signals B1, B2, B3, and B4, respectively. An output signal $\overline{carry_L}$ is sent to MSB adjust block 312 comprising multiplexers 356, 358, 360, 362, 364, 366, 368, and 370, NOT gate 372, and NAND gate 373 connected as shown. MSB adjust block 312 receives MSB signals $0_8$, $0_7$, $0_6$, and $0_5$ from adjust block 310. A similar transistor circuit comprising n-channel transistors 374, 376, 378, and 380 couple to MSB word A signals A8, A7, A6, and A5, respectively, and n-channel transistors 382, 384, 386, and 388 couple to LSB word B signals B5, B6, B7, and B8, respectively. An output signal $\overline{carry_M}$ is sent to adjust block 310 and to OR gate 390 through inverter 392 to generate signal $MSB_{carry}$.

In operation, signal $\overline{carry_L}$ will indicate the presence of a carry whenever the LSB of word A and the reversed LSB of word B have corresponding bit positions with a logic one level. For the example shown, signal A2 and signal B3 are at a logic one level that turn on transistors 344 and 352, respectively, causing the supply voltage VCC to pull down to ground, generating a logic zero level on signal $\overline{carry_L}$. Signal $\overline{carry_L}$ is used to add one to the MSB of the resulting thermometer code word in the event a carry condition exists on the LSB. Multiplexers 356, 358, 360, and 362 cause the MSB on signals $0_8$, $0_7$, $0_6$, and $0_5$ to shift to the left whenever $\overline{carry_L}$ is at a logic zero level by introducing a logic one level into the low order bit position.

Multiplexers 364, 366, 368, and 370 and NAND gate 373 ensure that the most significant byte is adjusted whenever $\overline{carry_L}$ causes the MSB of the thermometer code word to enter into a carry condition. Whenever the high order bit $0_8$ is at a logic one level and signal $\overline{carry_L}$ is at a logic zero level, a carry occurs on the MSB and it is reset to logic zero level and signal $MSB_{carry}$ indicates the carry condition. The MSB pull down circuit operates as previously described with reference to the LSB pull down circuit and generates a logic zero level on signal $\overline{carry_M}$. Signal $MSB_{carry}$ indicates whether a carry condition occurred on the MSB of the resulting thermometer code word either during MSB A and MSB B addition or through LSB carry.

In summary, addition and subtraction circuits perform arithmetic operations on two thermometer coded words. For subtraction, the two words are checked for the existence of borrowing conditions and MSBs and LSBs are adjusted accordingly. Subtraction is performed through exclusive-or functions and the results are reconstructed into proper thermometer code format. For addition, bit positions in the MSB and LSB for one word are reversed before performing exclusive-or functions with the second word. The result is inverted and reconstructed into thermometer code format. Carry conditions are checked and the result is adjusted to compensate for any carry.

Thus, it is apparent that there has been provided in accordance with the present invention, a method and device for adding and subtracting thermometer coded data that satisfies the advantages set forth above. Although the preferred embodiment has been described in detail, it should be understood that various changes, substitutions, and alterations can be made herein. For example, though arithmetic functions have been performed on two byte thermometer coded words, the present invention can be extended to any number of multiple byte thermometer coded words or even single byte thermometer coded words, each having any number of bits. As another example, many of the logic functions within the described circuitry can be altered and signal levels reversed for other design techniques. Other examples are readily ascertainable by one skilled in the art and could be made without departing from the spirit and scope of the present invention as defined by the following claims.

What is claimed is:

1. A device for subtracting two thermometer coded words which each include a plurality of bytes, comprising:

circuitry for determining a presence of a first relationship between said words;

circuitry for determining a presence of a second relationship between said words;

circuitry for decreasing a value of a first most significant byte corresponding to a first said word in response to said presence of said first relationship;

circuitry for decreasing a value of a second most significant byte corresponding to a second said word in response to said second relationship;

circuitry for subtracting the value of said first most significant byte from the value of said second most significant byte to obtain a first result; and circuitry for reconstructing said first result into proper thermometer code format.

2. The device of claim 1, further comprising:

circuitry for translating a first least significant byte corresponding to said first word in response to said second relationship;

circuitry for translating a second least significant byte corresponding to said second word in response to said first relationship;

circuitry for subtracting one of said first least significant byte and said translated first least significant byte from one of said second least significant byte and said translated second least significant byte to obtain a second result; and circuitry for reconstructing said second result into proper thermometer code format.

3. The device of claim 2, wherein said first translating circuitry comprises inverters and multiplexers for inverting and right shifting each bit position of said first least significant byte.

4. The device of claim 2, wherein said second translating circuitry comprises inverters and multiplexers for inverting and right shifting each bit position of said second least significant byte.

5. The device of claim 2, wherein said least significant byte subtracting circuitry comprises exclusive-or gates for performing an exclusive-or function on said first and second least significant bytes at each corresponding bit position.

6. The device of claim 2, wherein said second result reconstructing circuitry comprises a plurality of multiplexers, inverters, and NAND gates for shifting and rotating bit positions of said second result into proper thermometer code format.

7. The device of claim 1, wherein said first relationship circuitry comprises a first circuit indicating that said first most significant byte is greater than said second most significant byte and a second circuit indicating that a second least significant byte corresponding to said second word is greater than a first least significant byte corresponding to said first word.

8. The device of claim 7, wherein said first circuit comprises a plurality of n-channel transistors and n-channel transistors with inverting inputs, each n-channel transistor coupled to a separate bit position of said first most significant byte, each inverting input n-channel transistor coupled to a separate bit position of said second most significant byte, and wherein said second circuit comprises a plurality of n-channel transistors and n-channel transistors with inverting inputs, each n-channel transistor coupled to a separate bit position of said second least significant byte, each inverting input n-channel transistor coupled to a separate bit position of said first least significant byte.

9. The device of claim 8, wherein said n-channel and said inverting input n-channel transistors form transistor pairs corresponding to identical bit positions of said first and second words, said first relationship occurring when at least one said transistor pair conducts.

10. The device of claim 1, wherein said second relationship circuitry comprises a first circuit indicating that said second most significant byte is greater than said first most significant byte and a second circuit indicating that a first least significant byte corresponding to said first word is greater than a second least significant byte corresponding to said second word.

11. The device of claim 10, wherein said first circuit comprises a plurality of n-channel transistors and n-channel transistors with inverting inputs, each n-channel transistor coupled to a separate bit position of said second most significant byte, each inverting input n-channel transistor coupled to a separate bit position of said first most significant byte, and wherein said second circuit comprises a plurality of n-channel transistors and n-channel transistors with inverting inputs, each n-channel transistor coupled to a separate bit position of said first least significant byte, each inverting input n-channel transistor coupled to a separate bit position of said second least significant byte.

12. The device of claim 11, wherein said n-channel and said inverting input n-channel transistors form transistor pairs corresponding to identical bit positions of said first and second words, said second relationship occurring when at least one said transistor pair conducts.

13. The device of claim 1, wherein said first most significant byte decreasing circuitry comprises a plurality of multiplexers for decreasing said value of said first most significant byte by right shifting bit positions of said first most significant byte.

14. The device of claim 1, wherein said second most significant byte decreasing circuitry comprises a plurality of multiplexers for decreasing said value of said second most significant byte by right shifting bit positions of said second most significant byte.

15. The device of claim 1, wherein said most significant byte subtracting circuitry comprises a plurality of exclusive-or gates for performing an exclusive-or function on said first and second most significant bytes at each bit position.

16. The device of claim 1, wherein said first result reconstructing circuitry comprises a plurality of multiplexers for right shifting said first result into proper thermometer code format.

17. A device for adding two thermometer coded words which each include a plurality of bytes, comprising:

circuitry for adding a first least significant byte of a first word to a second least significant byte of a second word to obtain a first result, and reversing circuitry for arranging said second least significant byte in reverse bit order relative to said first least significant byte;

circuitry for determining a presence of a first carry associated with said first result;

circuitry for inverting said first result in response to said first carry;

circuitry for reconstructing one of said first result and said inverted first result into proper thermometer code format; and circuitry for adjusting said reconstructed first result in response to said first carry.

18. The device of claim 17, further comprising:

circuitry for adding a first most significant byte of said first word to a second most significant byte of said second word to obtain a second result, and reversing circuitry for arranging said second most significant byte in reverse bit order relative to said first most significant byte;

circuitry for determining a presence of a second carry associated with said second result;

circuitry for inverting said second result in response to said second carry;

circuitry for reconstructing one of said second result and said inverted second result into proper thermometer code format;

circuitry for adjusting said reconstructed second result in response to said second carry; and circuitry for altering said adjusted second result in response to said first carry.

19. The device of claim 18, wherein said second result adding circuitry comprises a plurality of exclusive-or gates, each exclusive-or gate connected to a separate bit position of said first most significant byte and to a separate reversed order bit position of said second most significant byte.

20. The device of claim 19, wherein said second result inverting circuitry comprises a plurality of NOT gates and multiplexers, each multiplexer connected to a separate output of said exclusive-or gates to couple said NOT gates thereto in response to said second carry.

21. The device of claim 18, wherein said second result reconstructing circuit comprises a plurality of multiplexers for right shifting said second result into proper thermometer code format.

22. The device of claim 18, wherein said second carry determining circuitry comprises a plurality of n-channel transistors, said n-channel transistors forming transistor pairs, each transistor pair connecting to a separate bit position of said first most significant byte and a separate reverse order bit position of said second most significant byte, said second carry occurring when at least one said transistor pair conducts.

23. The device of claim 18, wherein said second result adjusting circuitry comprises a plurality of multiplexers for right shifting bit positions of said reconstructed second result.

24. The device of claim 18, wherein said altering circuitry comprises a plurality of multiplexers for left shifting said adjusted second result in response to said first carry.

25. The device of claim 24, wherein said altering circuit detects an overflow condition caused by said first carry and alters said adjusted second result in response thereto.

26. The device of claim 25, wherein said altering circuitry generates a most significant byte carry signal in response to said second carry and said overflow condition.

27. The device of claim 17, wherein said first result adding circuitry comprises a plurality of exclusive-or gates, each exclusive-or gate connected to a separate bit position of said first least significant byte and to a separate reversed order bit position of said second least significant byte.

28. The device of claim 27, wherein said first result inverting circuitry comprises a plurality of NOT gates and multiplexers, each multiplexer connected to a separate output of said exclusive-or gates to couple each NOT gate thereto in response to said first carry.

29. The device of claim 17, wherein said first result reconstructing circuit comprises a plurality of multiplexers for right shifting said first result into proper thermometer code format.

30. The device of claim 17, wherein said first carry determining circuitry comprises a plurality of n-channel transistors, said n-channel transistors forming transistor pairs, each transistor pair connecting to a separate bit position of said first least significant byte and a separate reverse order bit position of said second least significant byte, said first carry occurring when at least one said transistor pair conducts.

31. The device of claim 17, wherein said first result adjusting circuitry comprises a plurality of multiplexers for right shifting bit positions of said reconstructed first result.

* * * * *